T. M. BOVARD.
CLOTHES LINE REEL.
APPLICATION FILED SEPT. 2, 1909.
967,601.
Patented Aug. 16, 1910.
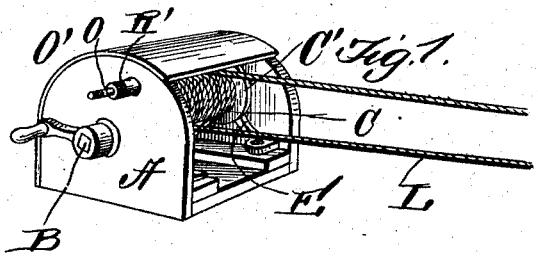
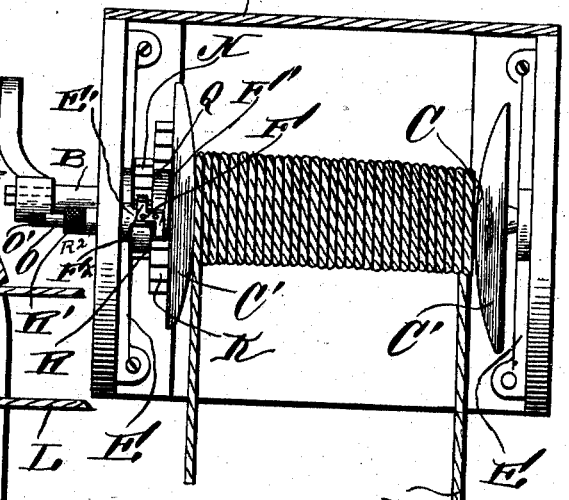
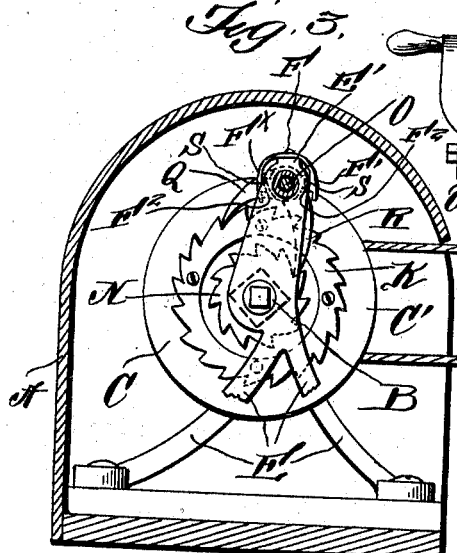
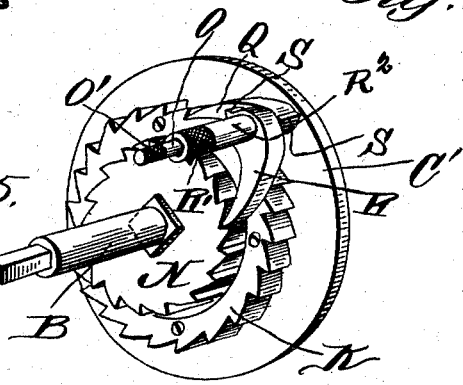
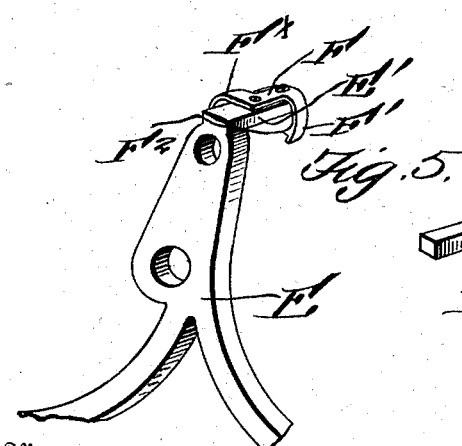
Witnesses
Inventor
Thomas M. Bovard
Attorney

UNITED STATES PATENT OFFICE.

THOMAS M. BOVARD, OF OAKDALE, PENNSYLVANIA.

CLOTHES-LINE REEL.

967,601.  Specification of Letters Patent.  Patented Aug. 16, 1910.

Application filed September 2, 1909. Serial No. 515,831.

*To all whom it may concern:*

Be it known that I, THOMAS M. BOVARD, a citizen of the United States, residing at Oakdale, in the county of Allegheny and State of Pennsylvania, have invented certain new and useful Improvements in Clothes-Line Reels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in reels for clothes lines and the object in view is to produce a simple and efficient device of this nature, comprising means for holding the line when not used and so constructed that the reel may be locked against rotation in opposite directions, allowing the reel to be operated from two different locations or by two different parties.

The invention comprises various details of construction, combinations and arrangements of parts which will be hereinafter fully described and then specifically defined in the appended claims.

My invention is illustrated in the accompanying drawings, in which:—

Figure 1 is a perspective view of the reel within its housing. Fig. 2 is a sectional view vertically through the same. Fig. 3 is a cross sectional view. Fig. 4 is an enlarged detail perspective, and Fig. 5 is a detail perspective view.

Reference now being had to the details of the drawings by letter, A designates a housing of any size or shape, and B is a reel shaft journaled in suitable bearings in the ends thereof, and C is a reel having flanged ends C'.

E—E designate bracket arms which have bearing apertures therein for the reception of the reel shaft. One of said bracket arms, shown in Fig. 5 of the drawings, has a lateral projection E' upon which is a plate F having two resilient arms F' F$^x$. Ratchet wheels K and N are fixed to said reel shaft and have their teeth arranged in opposite directions. A pin O is swiveled in the housing and the circumference of the outer end of said pin is milled as at O'. A pawl is fixed to the pin O and is adapted to engage the teeth of the ratchet wheel K, shown clearly in Fig. 4 of the drawings, while a second pawl R is mounted upon a hollow shaft R$^2$ telescoping over the pin O and which is provided with a milled circumference R for convenience in rocking the hollow shaft to which the pawl R is fastened for the purpose of throwing the latter into or out of engagement with the teeth of the ratchet wheel N. The pawls are disposed between the bracket E and one of the flanges of the reel so as to prevent displacement of the pawls. One of the resilient arms F$^x$ is adapted to bear yieldingly against the rib S upon the pawl R while the resilient arm F' bears against the rib S upon the pawl Q and serve to hold the pawls in engagement with the ratchet teeth of both ratchet wheels. It will be noted that the notches F$^2$ in the resilient arms F' and F$^x$ are adapted to engage one or the other of the ribs S upon the pawl should it be desired to hold the free end thereof out of engagement with the teeth of the ratchet wheel.

In operation, normally the wheel is held from rotation in either direction by the two pawls engaging each one of the ratchet wheels. In the event of it being desired to rotate the reel to the left, the operator by giving a partial rotary movement to the hollow shaft R$^2$ may cause the pawl R to be thrown out of the path of the ratchet wheel N, thus allowing the wheel to turn freely with the pawl Q riding loosely upon the teeth of the ratchet wheel K, the pawl R being held out of the path of the wheel N by means of the notch F$^2$ at the end of the arm F$^x$ engaging the rib S upon the pawl R. In the event of it being desired to reverse the rotary movement of the reel and cause the same to travel in the opposite direction, the pawl Q may be thrown out of engagement with the teeth of the wheel K and held suspended by the notched end F$^2$ of the resilient arm F', engaging the rib S upon the pawl Q, while the pawl R is released by disengaging the notched end of the resilient arm F$^x$ from the rib S upon the pawl R, allowing the free end of the latter to engage the teeth of the ratchet wheel N.

What I claim to be new is:—

1. A clothes line reel apparatus comprising, a casing, a reel journaled therein, ratchet wheels rotating with said reel and having reversely arranged teeth thereon, a rope winding about said reel, pawls engaging said wheels, and a plate having two resilient fingers, one adapted to bear against each pawl, as set forth.

2. In combination with a casing, bracket members mounted therein, a reel journaled in said brackets, ratchet wheels fixed to said reel and having reversely arranged teeth thereon, one of said brackets having a lateral projection, a plate fixed to said projection and having resilient fingers projecting in opposite directions thereon, pawls pivotally mounted upon the reel and one bearing against each ratchet wheel, said springs adapted to bear one against each of said pawls, as set forth.

3. In combination with a casing, bracket members mounted therein, a reel journaled in said brackets, ratchet wheels fixed to said reel and having reversely arranged teeth thereon, one of said brackets having a lateral projection, a plate fixed to said projection and having resilient fingers projecting in opposite directions thereon, a swiveled pin carried by one of the flanges of the reel, a pawl fixed to said pin and adapted to engage the teeth of one of said ratchet wheels, a second pawl engaging the teeth of the other ratchet wheel and having a hollow shank portion telescoping over said pin, resilient fingers fixed to said plate and projecting in opposite directions, and each designed to bear against one of said pawls, as set forth.

In testimony whereof I hereunto affix my signature in presence of two witnesses.

THOMAS M. BOVARD.

Witnesses:
J. B. RIFLEY,
E. D. SLAUGENHAUPT.